(12) United States Patent
Hutson

(10) Patent No.: US 8,794,564 B2
(45) Date of Patent: Aug. 5, 2014

(54) VEHICLE CAPABLE OF IN-AIR AND ON-GROUND MOBILITY

(75) Inventor: Donald B. Hutson, San Diego, CA (US)

(73) Assignee: Neurosciences Research Foundation, Inc., La Jolla, CA (US)

( * ) Notice: Subject to any disclaimer, the term of this patent is extended or adjusted under 35 U.S.C. 154(b) by 441 days.

(21) Appl. No.: 13/565,656

(22) Filed: Aug. 2, 2012

(65) Prior Publication Data

US 2014/0034776 A1 Feb. 6, 2014

(51) Int. Cl.
*B64C 25/36* (2006.01)
*B64C 25/32* (2006.01)
*B64C 27/08* (2006.01)
*B64C 27/00* (2006.01)
*B64C 39/00* (2006.01)

(52) U.S. Cl.
USPC ....... 244/17.17; 244/17.23; 244/50; 244/23 C

(58) Field of Classification Search
CPC .... B64C 11/001; B64C 25/001; B64C 25/32; B64C 25/36; B64C 27/006; B64C 27/08; B64C 27/20; B64C 39/028
USPC ........... 244/17.17, 17.23, 17.25, 17.11, 23 A, 244/23 B, 23 C, 12.2, 12.3, 50; 180/7.4, 7.1, 180/10, 119; 280/206–208; 446/36–45
See application file for complete search history.

(56) References Cited

U.S. PATENT DOCUMENTS

| 3,638,502 | A |   | 2/1972  | Leavitt |             |
|-----------|---|---|---------|---------|-------------|
| 3,746,117 | A | * | 7/1973  | Alred   | 180/7.4     |
| 3,876,025 | A | * | 4/1975  | Green   | 180/7.4     |
| 4,505,346 | A | * | 3/1985  | Mueller | 180/7.4     |
| 6,976,899 | B1| * | 12/2005 | Tamanas | 446/178     |
| 7,714,536 | B1|   | 5/2010  | Silberg |             |
| 7,959,104 | B2| * | 6/2011  | Kuntz   | 244/50      |
| 8,147,289 | B1| * | 4/2012  | Lee     | 446/36      |
| 8,167,234 | B1| * | 5/2012  | Moore   | 244/17.23   |
| 8,322,648 | B2| * | 12/2012 | Kroetsch et al. | 244/17.23 |
| 2007/0173173 | A1 | * | 7/2007  | Suzuki | 446/431 |
| 2010/0243794 | A1 |   | 9/2010  | Jermyn |         |
| 2011/0221900 | A1 |   | 9/2011  | Reich  |         |
| 2011/0301784 | A1 |   | 12/2011 | Oakley |         |

FOREIGN PATENT DOCUMENTS

CN 102785775 11/2012
WO WO 2013182708 A1 * 12/2013 ............. A63H 27/00

OTHER PUBLICATIONS

International Searching Authority at the U. S. Patent and Trademark Office, International Search Report and Written Opinion for International Patent Application No. PCT/US2013/053006, Apr. 9, 2014, 11 pages.
International Searching Authority at the U. S. Patent and Trademark Office, International Search Report and Written Opinion for International Patent Application No. PCT/US2013/052999, Apr. 9, 2014, 9 pages.

* cited by examiner

*Primary Examiner* — Tien Dinh
*Assistant Examiner* — Richard R Green
(74) *Attorney, Agent, or Firm* — Meyer IP Law Group

(57) ABSTRACT

In specific embodiments, a vehicle propellable through fluids or along surfaces, comprises a main work section and a plurality of propulsion units for propelling the main work section. The main work section supports one or more payloads. The propulsion units each include a rotor system and a ring-shaped wheel at least partially arranged about the rotor system and rotatable about the rotor system. The ring-shaped wheel is arranged at a banked angle relative to the rotor system.

20 Claims, 16 Drawing Sheets

VEHICLE CAPABLE OF IN-AIR AND ON-GROUND MOBILITY

STATEMENT REGARDING FEDERALLY SPONSORED RESEARCH AND DEVELOPMENT

Statement Regarding Federally Sponsored Research and Development: This invention was made with Government support under FA8750-11-2-0255 awarded by the USAF/AFRL. The United States Government has certain rights in the invention.

RELATED APPLICATION

This application is being filed concurrently with U.S. patent application Ser. No. 13/565,654, filed on Aug. 2, 2012, entitled VEHICLE CAPABLE OF STABILIZING A PAYLOAD WHEN IN MOTION, by Donald B. Hutson, which is incorporated herein by reference.

FIELD OF THE INVENTION

This invention relates generally to vehicles capable of traveling along surfaces and through fluids.

BACKGROUND OF THE INVENTION

Quadrotor helicopter (or quadcopter) designs have become popular in unmanned aerial vehicle (UAV) research. These vehicles use an electronic control system and electronic sensors to stabilize the aircraft. There are several advantages to quadcopters over comparably-scaled helicopters. Quadcopters do not require mechanical linkages to vary the rotor blade pitch angle as they spin, simplifying the design and maintenance of the vehicle. Further, the use of four rotors allows each individual rotor to have a smaller diameter than the equivalent helicopter rotor, allowing them to possess less kinetic energy during flight. The reduced kinetic energy reduces damage caused should the rotors strike anything. For small-scale UAVs, this makes the vehicles safer for close interaction. However, for larger-scale UAVs, the rotating blades can still cause significant damage, making them inappropriate for use in enclosed spaces. Further, in enclosed spaces flight dynamics are altered, with eddy currents and suction causing problems with control of flight. Further, dynamic and unpredictable environments are not limited to enclosed spaces, but rather can occur in virtually any environment as a result of such things as changing landscape, changing wind dynamics, and the behaviour of other actors operating within an operating space of the UAV. What is needed is a vehicle that can overcome problems with flight in enclosed spaces and dynamic environments, and use multiple modes of mobility to navigate in enclosed spaces, partially confined spaces, open landscapes, and any other environment the vehicle may encounter.

SUMMARY

In accordance with an embodiment of the invention, a vehicle propellable through fluids or along surfaces comprises a main work section for supporting one or more payloads and a plurality of propulsion units for propelling the main work section. Each of the propulsion units includes a rotor system and a ring-shaped wheel at least partially arranged about the rotor system and rotatable about the rotor system. The ring-shaped wheel is arranged at a banked angle relative to the rotor system so that when the vehicle is level and moving horizontally along a plane, for each of the propulsion units the banked angle is such that the ring-shaped wheel extends outside of the rotor system so that the ring-shaped wheel contacts, before the rotor system contacts, any surface perpendicular to or parallel to the plane.

In some embodiments, the propulsion units of the vehicle further comprises a ring-shaped hub at least partially arranged about the rotor system and the ring-shaped wheel is rotatable about the ring-shaped hub by a wheel motor connected with the ring-shaped hub. In some embodiments, the vehicle comprises four propulsion units approximately symmetrical arranged about the vehicle and connected with the main work section by an arm frame. In some embodiments, the rotor system of each of the propulsion units includes at least two rotor blades. In some embodiments, a pitch of the rotor blades can be collectively controlled.

In some embodiments, the main work section of the vehicle includes a payload support hub, a payload support structure rotatable about the payload support hub, and a core at least partially nested within the payload support hub. The one or more payloads is mountable on the payload support structure, which in some embodiments allows multi-axis rotation of a mounted payload. The one or more payloads can include one or more sensor payloads and/or one or more effector payloads. In some embodiments, the payload support structure of the main work section is rotatable 360° about the payload support hub in at least one axis. The core can include at least one microprocessor adapted to substantially maintain an orientation of the payload support structure relative to a horizon line as the vehicle is propelled.

In some embodiments, the vehicle further comprises a hook connected with the payload support structure. The hook can be adapted to catch a structure and support the vehicle on the structure. In some embodiments, the hook is adapted to charge a battery of the vehicle when the structure on which the vehicle is supported is a power line or other source of electrical current.

DETAILED DESCRIPTION OF THE DRAWINGS

Figure 1:
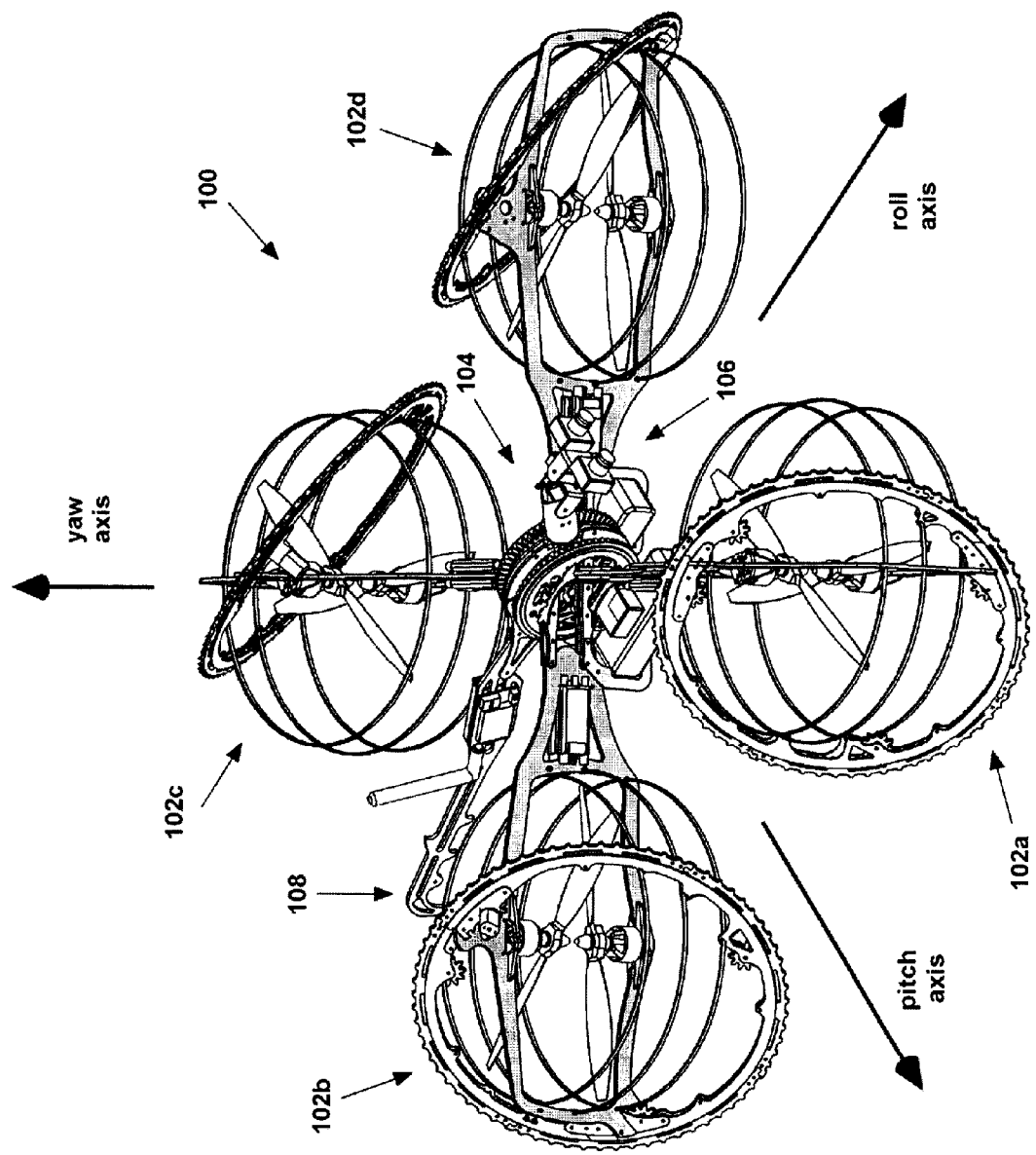
FIG. 1 is a front perspective view of an embodiment of a vehicle in accordance with the present invention adapted to travel along surfaces and through fluids.

The following description is of the best modes presently contemplated for practicing various embodiments of the present invention. The description is not to be taken in a limiting sense but is made merely for the purpose of describing the general principles of the invention. The scope of the invention should be ascertained with reference to the claims. In the description of the invention that follows, like numerals or reference designators will be used to refer to like parts or elements throughout. In addition, the first digit of a reference numeral identifies the embodiment being described so that features having reference numerals with common first digits are described with respect to a common embodiment.

FIG. 1 is a front perspective view of an embodiment of a vehicle 100 in accordance with the present invention adapted for moving along surfaces and moving through fluids. The vehicle 100 includes four propulsion units 102a-102d arranged at corners of the vehicle 100 and connected with arm frames extending from a main work section 104. The main work section 104 is shown in detail in FIGS. 2 and 3, separated from the propulsion units 102a-102d to more clearly show its components. The main work section 104 includes a multi-axis, hollow bore gear box 110, also referred to herein as a multi-axis stability system, having a payload support hub and a payload support structure rotatable about the payload support hub. The payload supports structure comprises one or more rotatable plates (two as shown) 112 sandwiched between two rotatable gears 114. The rotatable gears 114 themselves are each sandwiched between a pair of hub plates 116 that act as the payload support hub, and that are rigid relative to support braces 140bd for supporting the propulsion units 102b and 102d and support braces 140ac (shown in FIG. 4) for supporting the propulsion units 102a and 102c. Motors 118 independently drive the two rotatable gears 114. The stability system 110 can act as a quasi three-axis gimbal. When the rotatable gears 114 are rotated in the same direction, the rotatable plates 112 are rotated about a pitch axis of the vehicle 100. When the rotatable gears 114 are rotated in opposite directions, the rotatable plates 112 remain in place and any geared payloads arranged between the teeth of the rotatable gears 114 can be rotated about a second axis that can extend anywhere from the roll axis to the yaw axis, depending on the position of the payload about the pitch axis.

Figure 2:
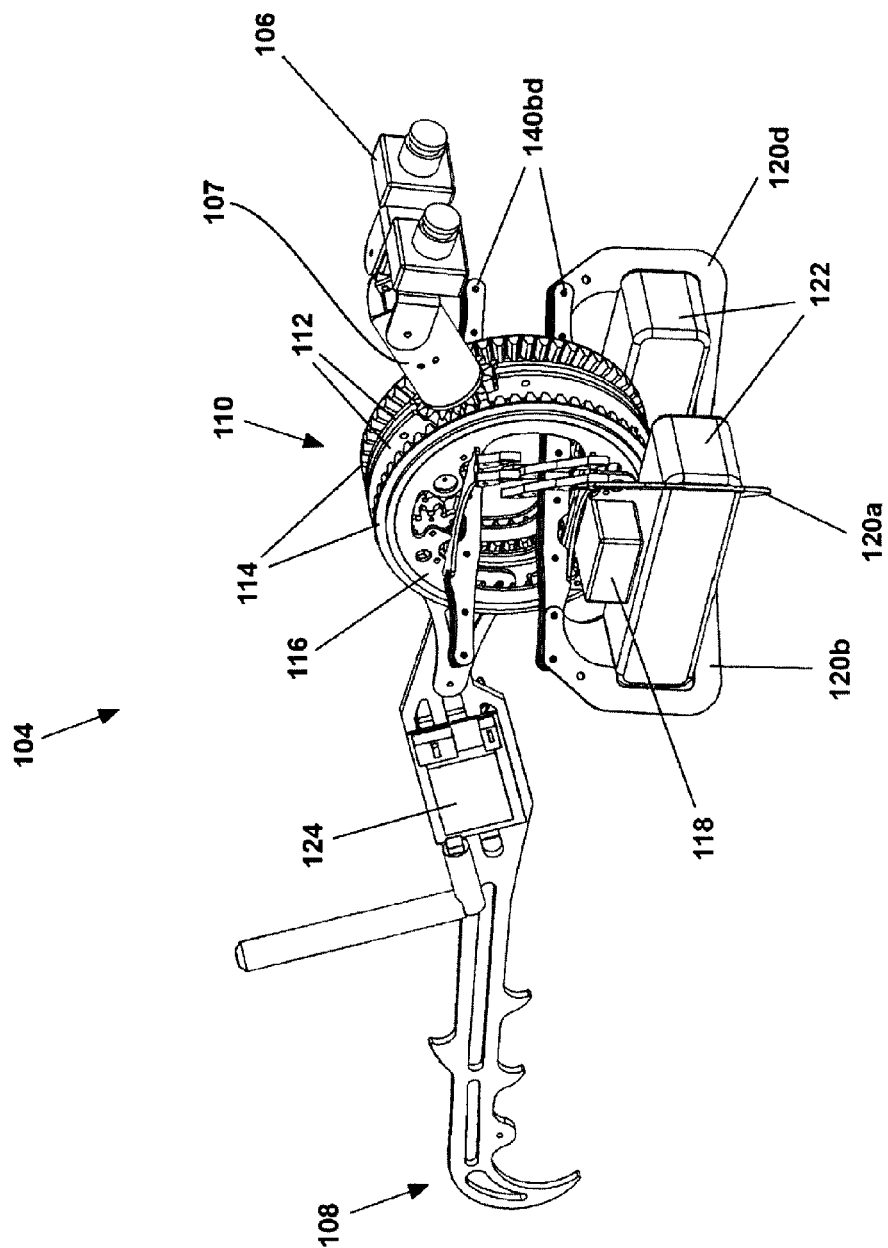
FIG. 2 is a front perspective view of a main work section of the vehicle of FIG. 1 in isolation.
Figure 3:
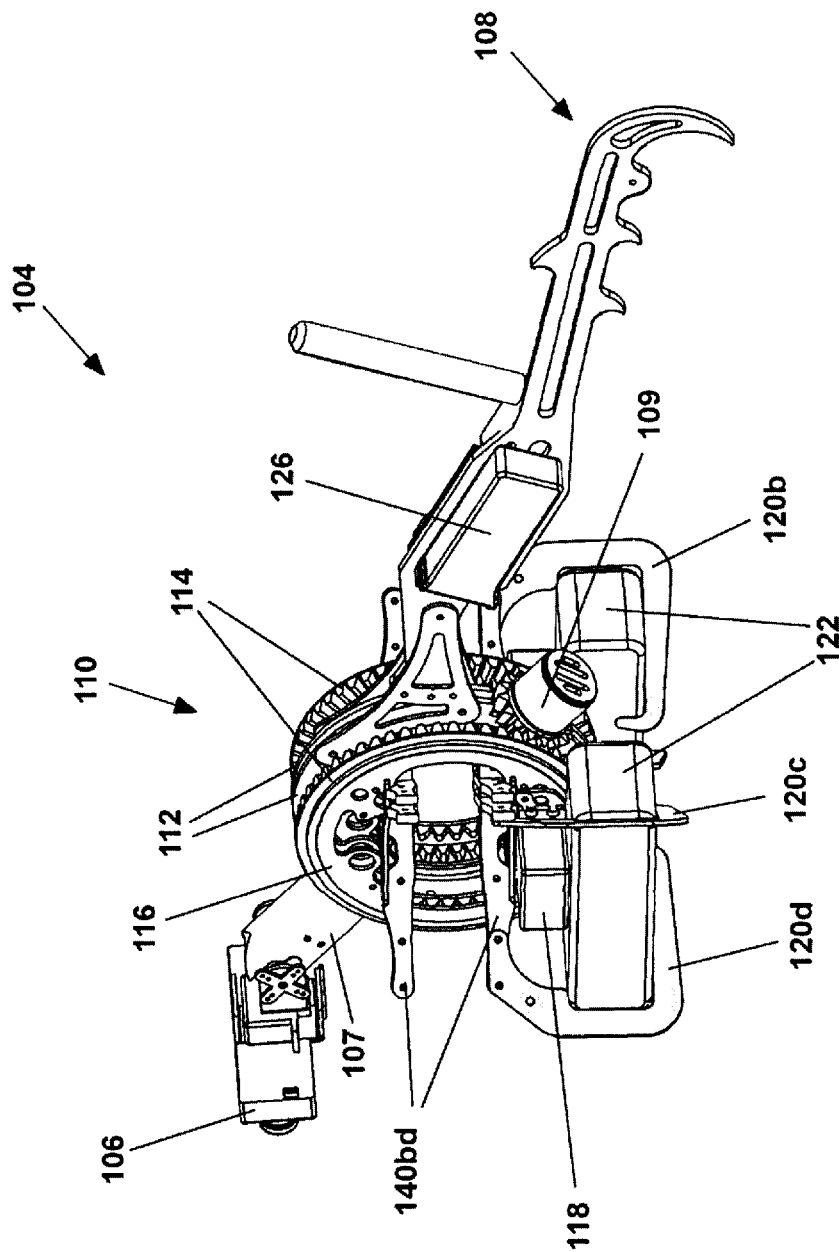
FIG. 3 is a rear perspective view of a main work section of the vehicle of FIG. 1 in isolation.

As shown in FIGS. 2 and 3, there are two geared payloads in the form of two geared booms 107 and 109. The two booms 107 and 109 are generally positioned at opposite ends of the stability system 110 to keep the spacing of the rotatable gears 114 generally balanced along the circumference of the stability system 110 and to help ensure smooth counter-rotation of the rotatable gears 114. While the second boom 109 acts only as an idle gear in the embodiments shown, in other embodiments the second boom 109 can support an additional payload such as a sensor or other device.

In a preferred embodiment, the payload support structure can be rotated 360° about the pitch axis. Rotating the payload support structure about the pitch axis can allow the payload support structure to compensate for pitching motions that can occur during flight, thereby maintaining the orientation of the payload during such motions. Control of orientation can be important, for example, where a camera mounted on the payload support structure is relied upon by a controller, for example a ground-based pilot, a ground-based computer, or an onboard computer, to pilot the vehicle by relying on knowledge of true horizon to prevent becoming disoriented. Control of orientation can also be important, for example, where surveillance video is being recorded and there is a desire to avoid or reduce instability in the recording. In other embodiments, however, the rotation range can be limited. Further, rotating the payload support structure about an axis perpendicular to the pitch axis can allow the payload support structure to compensate for rolling motions that can occur during flight and where the payload extends along the roll axis, or to compensate for yawing motions that can occur during flight and where the payload extends along the yaw axis, or partially compensate for such motions when the payload extends at an angle between the roll and yaw axes.

A camera 106 extending from the rotatable plates 112 is pivotably hinged at the end of the first boom 107 in two positions so as to allow two degrees of freedom relative to the boom 107. As described above, the base of the boom 107 is geared to allow the camera 106 to accommodate rolling and/or yawing motions of the vehicle 100. As the rotatable plates are rotated and the angle of the camera 106 is changed relative to true horizon, the camera can pivot to remain level with true horizon. Further, as the vehicle performs a yaw motion, the camera can pivot from side to side to compensate for the yaw so that the lenses remain fixed on a location. As can be seen, the camera 106 includes two lenses spaced apart to provide stereoscopic video recording and/or transmission of stereoscopic images. However, in other embodiments the camera can have any number of lenses in any number of configurations. Further, the camera need not operate in the visible spectrum, but can alternatively work in the infrared or ultra-violet spectrums. The camera 106 of FIGS. 1-8 is merely exemplary and is not intended to be limiting. Any camera having a size, shape, and weight supportable by the vehicle and the boom 107 is usable with embodiments of the present invention. Still further, embodiments of vehicles in accordance with the present invention need not necessarily include a camera. For example, the vehicle can rely on a non-visual navigation technique, such as sound-based navigation techniques, or location-based navigation techniques that rely on signals such as global position system (GPS) signals combined with other sensors to determine altitude and proximity to objects within the vehicle's operating space.

As can be seen in FIG. 3, a hook 108 extends from the rotatable plates 112 at a position between approximately 120° to 180° away from the camera 106 along the surface of the rotatable plates 112, although in other embodiments the hook can be arranged elsewhere along the rotatable plates. Unlike the camera 106, the hook 108 is not geared and cannot be rotated about a second axis, but the hook 108 will rotate about the first axis (i.e., will pitch forward and backward) along with the camera 106 and other payloads mounted on the rotatable plates 112 when the rotatable plates 112 themselves are rotated. In other embodiments the hook 108 can be geared as well. As described further below, the hook 108 can be used to catch the vehicle 100 on a protruding feature, such as the ledge of a building. Still further, in some embodiments, the hook 108 can allow the vehicle 100 to hang from a power line, for example by rotating the rotatable plates 112 so that the hook extends upwards vertically. In some embodiments, the hook 108 can be used to recharge batteries of the vehicle 100 using a magnetic field generated by current travelling through the power line while the vehicle 100 hangs from the power line. Also shown connected with the hook are a video uplink device 124 on one side and a secondary battery 126 on an opposite side, although in other embodiments these devices can be otherwise mounted on the vehicle, such as at a different location of the rotatable plates, or alternatively on a non-rotating structure of the vehicle.

More generally, the vehicle 100 acts as a mobile platform for payloads. While FIGS. 1-3 illustrate four examples of payloads: a camera 106 attached to a geared boom 107, a hook 108 fixedly connected to the rotatable plates 112, and a video uplink device 124 and secondary battery 126 attached to the hook 108, myriad different devices can be mounted on the vehicle as payloads. Devices that collect information, such as cameras and the like, are also referred to herein as sensor payloads. Sensor payloads themselves can comprise myriad different devices, including but not limited to radio detection and ranging (RADAR) devices, light detection and ranging (LIDAR) devices, infrared sensing devices, ultrasonic sensing devices, navigation devices (e.g., GPS), proximity sensors, 3D scanners, KINECT® motion sensing input devices, etc. The type and number of sensor payloads usable with the vehicle is only limited by the ability of the vehicle to support, for example, the size, shape, weight, and power demands of the sensor payload. Still further, devices that can act on or effect an operating environment and objects within the operating environment can be supported by the vehicle, and are referred to herein as effector payloads. Effector payloads can comprise myriad different devices, including but not limited to projectile-firing devices, lasers, self-propelled guided weapons (e.g. missiles), electroshock devices, tranquilizing devices, gas deploying devices, explosive weapons, etc. Effector payloads can be used in combination with sensor payloads, for example, in military operating theatres to provide low collateral strikes. For example, the ability to surveil and identify a target from close proximity, and deliver an effector payload to neutralize only the target can prevent civilian casualties. Effector payloads can also be used in combination with sensor payloads, for example, in security contexts to provide non-lethal, incapacitating capabilities. For example, infrared cameras used in unlit spaces can identify the outline of an intruder and act to tranquilize the intruder with maximum affect.

The hub plates 116 and other components of the payload support hub as well as the payload support structure define a space within the main work section 104 that is located substantially central to the vehicle and the vehicle's propulsion units. A core for controlling the vehicle can be arranged within this space. The core can comprise, for example, at least one microprocessor and position sensors. Centralizing a microprocessor and position sensors can minimize the degree and speed of motion experienced by the microprocessor and position sensors during vehicle operation and maximize the ability of the microprocessor to determine the vehicle's attitude, speed, angular velocity, and other motion characteristics. Also positioned in the space are cross-braces 140*bd* that extend through the space and extend out of the space. The cross-braces 140*bd* support the arm frames connecting the propulsion units 102*a*-102*d* to the main work section 104. The cross-braces 140*bd* also support mounting brackets 120*a*-120*d* that hang below the main work section 104 and that support a pair of primary batteries 122 for providing a main source of power to the vehicle 100. Although in other embodiments, the primary batteries 122 can be mounted elsewhere on the vehicle, including on the arm frames 142*a*-142*d* or on the stability system 110. In such embodiments, the mounting brackets 120*a*-120*d* can support some other payload, such as an effector payload comprising laser guided missiles. In such embodiments, the orientation of the guiding laser can be mounted on the stabilizing system 110 so that the orientation of the missiles themselves are relatively unimportant, as the missiles will correct course to follow a path leading to a target identified by the laser. Still further, in other embodiments, additional or alternative mounting brackets or mounting structures can extend above the stabilizing system 110 to support non-self stabilized payloads.

Figure 4:
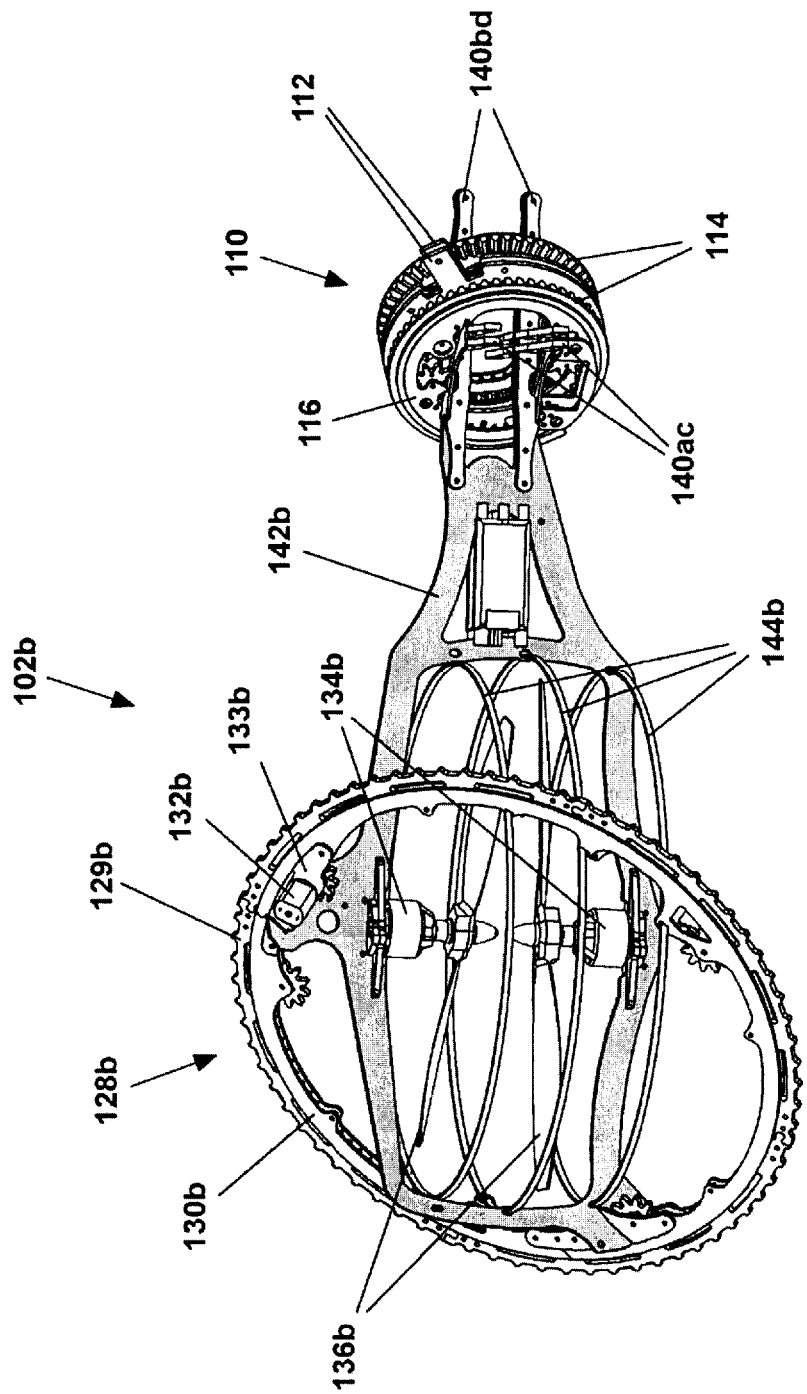
FIG. 4 is a perspective view of a propulsion unit of the vehicle of FIG. 1 in isolation.

A propulsion unit 102*b* is shown in detail in FIG. 4, separated from a substantial portion of the vehicle to more clearly show its components. The propulsion unit 102*b* comprises an arm frame 142*b* connected with the main work section 104 by a cross-brace 140*bd* that extends through the space defined by the payload support hub as well as the payload support structure, which are partially shown. In some embodiments, the arm frame 142*b* can be fabricated from a single sheet of material to reduce weight and simplify fabrication. For example, the arm frame 142*b* can be fabricated from carbon fiber, although in other embodiments the arm frame can be fabricated from one of or a combination of titanium, polyoxymethylene (POM) (e.g., Delrin®), Kevlar®, and other materials or combination of materials that are consistent with the weight and strength specifications of the listed materials. Power and control signals can be delivered to the propulsion units by wires running along the arm frame 142*b*. Alternatively, the arm frame 142*b* can include internal wiring or conductive paths printed on the surface of the arm frame 142*b*.

A distal end of the arm frame 142*b* expands to resemble an open hoop. A rotor system is connected within the hoop of the arm frame 142*b* and as shown comprises a pair of rotor blades 136*b* rotated by a pair of rotor motors 134*b* connected to the top and bottom of the arm frame 142*b*, respectively, and extending toward each other. In other embodiments the rotor system can comprise a single rotor blade, or more than one rotor blade. One of ordinary skill in the art will appreciate, upon reflecting on the teachings provided herein, the numerous different rotor blade configurations that can be substituted for that shown in FIG. 4. The rotor blades allow the vehicle 100 to operate as a quadcopter that is liftable and propellable through air or other fluids. The rotor system is at least partially shielded from objects and surfaces that the vehicle comes into contact with by rotor guards 144*b*. As shown, there are three rotor guards 144*b* each of which is a relatively thin ring connected through the sides of the hoop of the arm frame 142*b*. In other embodiments, any number of rotor guards or no rotor guards can be used. Further, a rotor guard need not be shaped as shown in FIG. 4.

Figure 5:
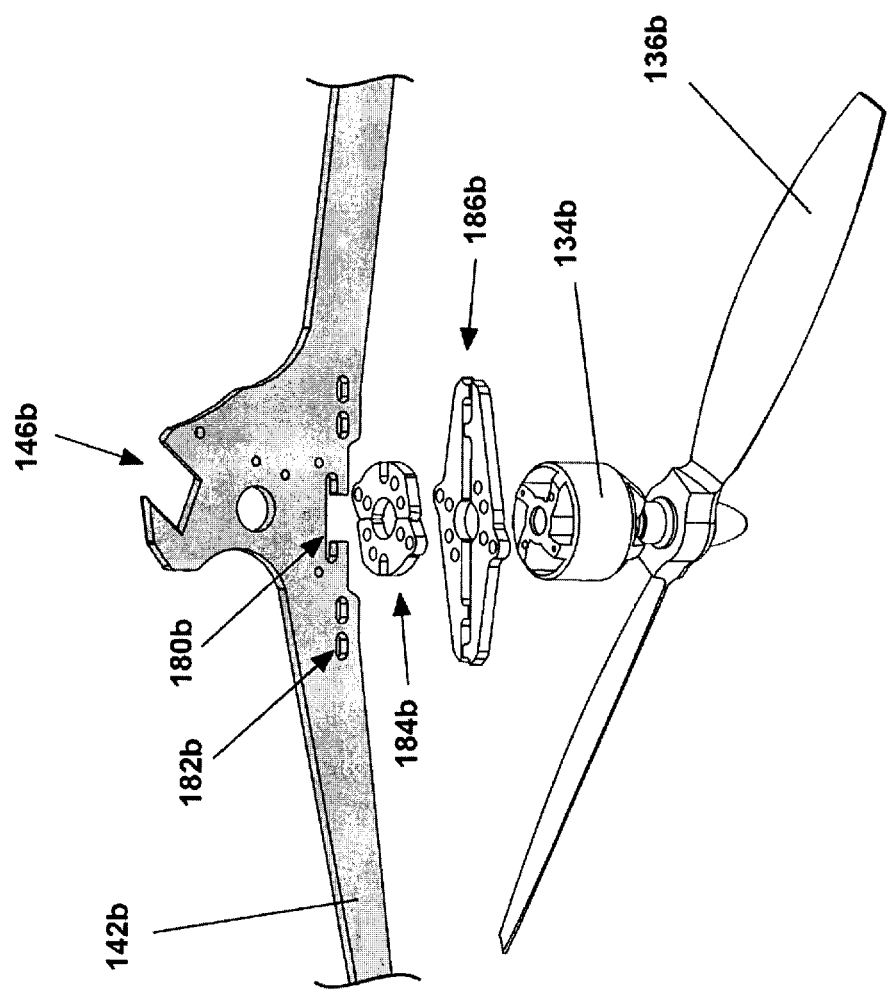
FIG. 5 is an isolated exploded view illustrating how a rotor motor can be mounted to an arm frame of the vehicle of FIG. 1.

FIG. 5 illustrates an exploded detail view of a system for mounting a rotor motor 134*b* on the arm frame 142*b*. A first collar 184*b* comprises a pair of short pieces that mirror and abut each other lengthwise and that are fitted within an inner slot 180*b* of the arm frame 142*b*. A second collar 186*b* comprises a pair of long pieces that mirror and abut each other width wise, the long pieces having protrusions that fit within a series of outer slots 182*b*. The first collar 184*b* and second collar 186*b* are fixed together and to the rotor motor 134*b* by hardware inserted through slots in the collars 184*b*, 186*b* and mated with threaded holes of the rotor motor 134*b*. The system allows the use of parts fabricated from sheets, such as described above for the arm frame 142*b*. The pieces of the first collar 184*b* and the second collar 186*b* can be fabricated from such sheets, simplifying manufacturing and reducing weight.

In embodiments of vehicles in accordance with the present invention, each arm frame also supports a rotatable wheel that can propel the vehicle 100 along a surface. The wheels 128*a*-128*d* can operate independent from the rotor systems or in conjunction with the rotor systems. The wheels 128*a*-128*d* of the vehicle 100 can be automatically operated when sensors detect that the vehicle 100 has contacted a surface, or alternatively (or selectively) the wheels 128*a*-128*d* can be manually operated, for example by a person piloting the vehicle. As shown in FIG. 4, a wheel 128*b* comprises a ring-shaped hub 130*b* connected with the arm frame 142*b* and at least partially arranged about the rotor system. The ring-shaped hub 130*b* has an inner diameter larger than the outer diameter of the rotor system so that rotor system is nested within the wheel 128*b* and the rotor blades 136*b* of the rotor system can spin freely without interference from the wheel 128*b*. The wheel 128*b* is not arranged perpendicular to the rotor system, but rather is set at an angle relative to perpendicular. The arrangement of the wheel 128*b* at an angle reduces obstruction to movement of air (or other fluids) through the rotor system, but also allows the wheel 128*b* to contact and move along surfaces both horizontal and vertical to the vehicle 100, as is discussed in more detail below.

Figure 6:
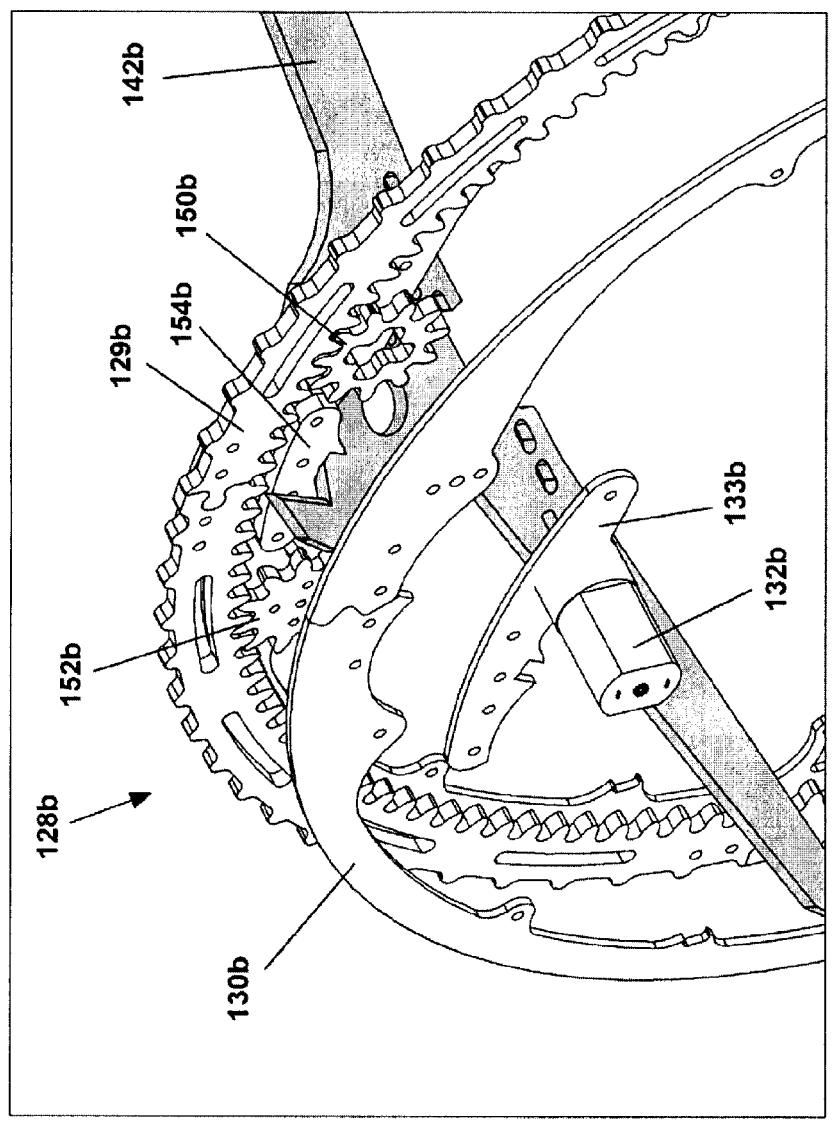
FIG. 6 is an isolated, partial exploded view illustrating how a wheel can be mounted to an arm frame of the vehicle of FIG. 1.

FIG. 6 is a partial exploded view of the wheel 128*b* with other components of the propulsion system removed to allow a clearer view of how the wheel 128*b* is mounted on the arm frame 142*b*. The ring-shaped hub 130*b* comprises a pair of plates which sandwich a ring-shaped rotatable portion 129*b* of the wheel 128*b* having an inner diameter that is toothed to mesh with gears 150*b* and 152*b* fixedly connected with the ring-shaped hub 130*b* and an outer diameter having a tread for gripping surfaces to propel the vehicle 100 along the surfaces. A wheel motor 132*b* for rotating the driving gear 150*b* of the wheel 128*b* is associated with a motor plate 133*b* that is mounted to the outside of the ring shaped hub 130*b*. Although shown outside of the arm frame 142*b*, the plates of the ring-shaped hub 130*b*, the motor plate 133*b*, and a support plate 154*b* are all fitted together and rest within a notch 146*b* (shown in FIG. 5) of the arm frame 142*b*. The support plate 154*b* is arranged between the ring-shaped rotatable portion 129*b* of the wheel and the notch 146*b*. As the wheel motor 132*b* drives the driving gear 150*b*, the support gear 152*b* rotates freely and helps keep the ring-shaped rotatable portion 129*b* appropriately spaced from other components. As with the rotor motor mounting components including the first collar 184*b* and the second collar 186*b*, the wheel components can be fabricated from sheets to simplify manufacturing and reduce weight.

The tread of the outer diameter of the ring-shaped rotatable portion 129*b* as shown includes a plurality of protrusions spaced apart by a gap; however, nearly any conceivable texture can be used for tread. Further, the texture of the tread can be customized to suit an anticipated environment. The tread can also include a grip material coating the outer surface of the rotatable portion 129*b*. For example, the tread can be rubberized. Still further, the outer surface of the rotatable portion can include some other feature, such as a miniature tube-in-tire feature that can dampen impacts when the vehicle contacts a surface, or the outer surface can flare out or mushroom to have a wider width than the rest of the wheel, thereby increasing surface area for gripping opposing surfaces. One of ordinary skill in the art, upon reflecting on the teachings herein, will appreciate the myriad different wheel surfaces which can be used propel a vehicle along a surface.

Figure 7:
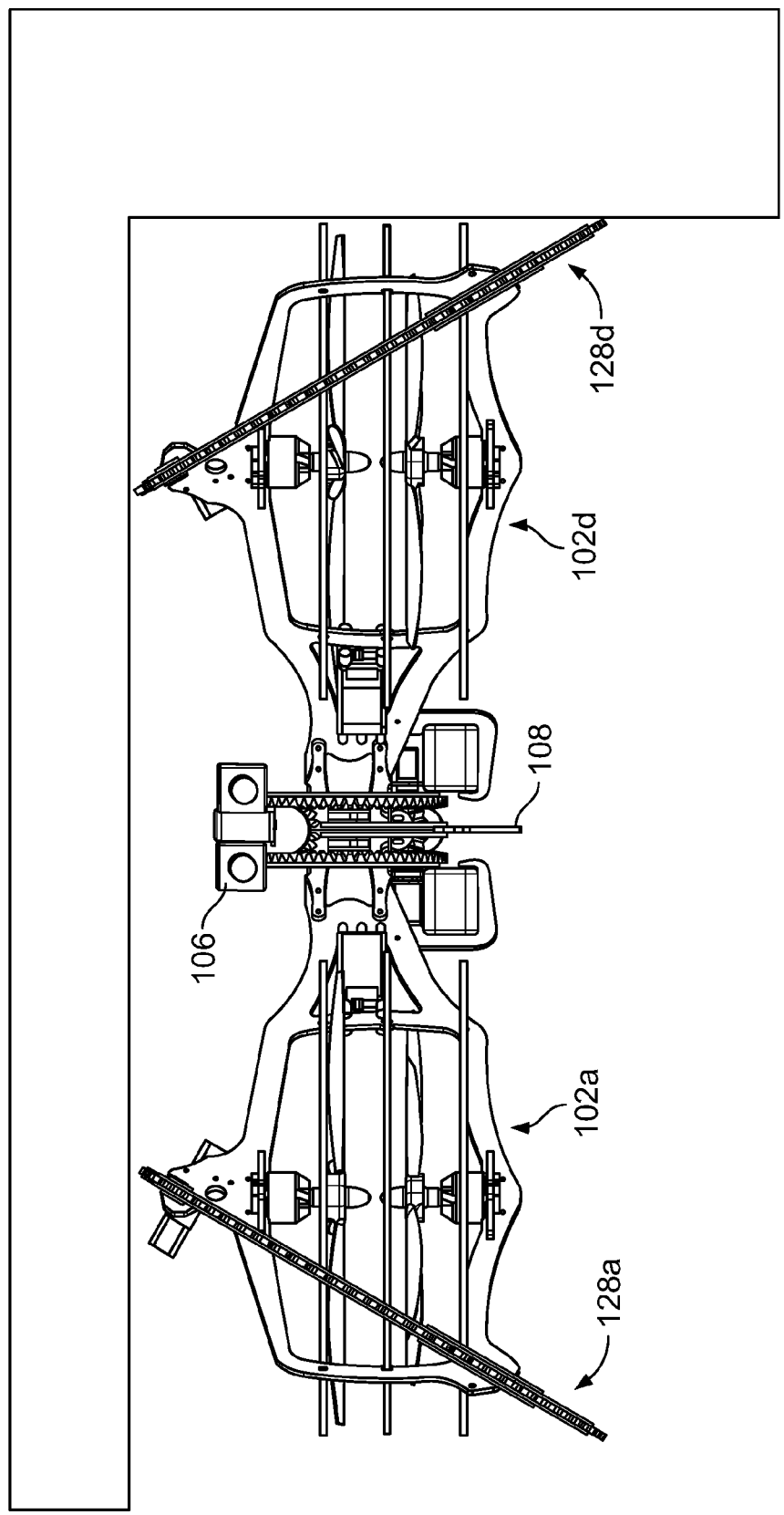
FIG. 7 is a front view of the vehicle of FIG. 1 travelling along a wall and a ceiling.

As will be appreciated, helicopters and quadcopters of the prior art are generally ill-suited and not practical for use within of buildings or otherwise enclosed spaces. Rotor blades of helicopters and quadcopters create a vacuum effect as the vehicle approaches the ceiling. Embodiments of vehicles in accordance with the present invention take advantage of the vacuum effect created by the rotor system to improve traction between the wheels and a ceiling, making such embodiments well suited for indoor use. FIG. 7 is a front view of the vehicle 100 of FIGS. 1-6 in an enclosed environment. The vehicle is shown moving along either a ceiling or a wall perpendicular to the ceiling. As can be seen, the angled arrangement of the left side wheels 128*c* (not shown) and 128*d* allow the wheels 128*c* and 128*d* to contact the wall and the ceiling, providing one of the surfaces for the wheels 128*c* and 128*d* to act against while the right side wheels 128*a* and 128*b* (not shown) contact the ceiling. The extension of the wheels outside of the diameter of the rotor system in the vertical plane helps prevent contact or collision with the wall from impeding movement of the vehicle. As shown, the tread of the wheels has a surface that appears generally flat and perpendicular to the wheels so that a corner of the tread contacts the surfaces; however, the tread can alternatively be bevelled so that the entire width of the tread contacts the surface. Alternatively, the tread can be rounded. Alternatively, the tread can be pliable so that the force applied by the vehicle against the surface causes the tread to deform to substantially match the surface.

While FIG. 7 shows the vehicle 100 moving along surfaces above, the vehicle 100 is also capable of moving along surfaces below. When moving along surface below the vehicle 100, the rotor systems of the propulsion units 102*a*-102*d* are not active, reducing power consumption. The wheels 128*a*-*d* of the vehicle 100 can be used to propel the vehicle along floors, ground terrain, rooftops, and across any other surface that provides sufficient traction and space to maneuver. In the embodiment shown, the wheels 128*a*-*d* are driven by separate, independently controlled wheel motors 132*a*-*d*, allowing the vehicle 100 to rotate in place without moving forward or backward. Optionally, when the rotor system is activated and the vehicle gains lift, sensors on the wheels can detect when the vehicle leaves the surface and deactivate the wheels, allowing the vehicle to continue taking advantage of the propulsive force of the wheels until there is no surface for the wheels to act against. Further, because the wheels are driven by independent motors, embodiments of vehicles in accordance with the present invention are uniquely capable of combining modes of locomotion. For example, the vehicle can move along a narrow ledge pitched forward with one of its propulsion units driving a corresponding wheel against the surface of the ledge while the corresponding rotation system remains inactive, while the propulsion units not supported by the ledge propel the vehicle with corresponding rotor systems while the corresponding wheels remains inactive.

Figure 8:
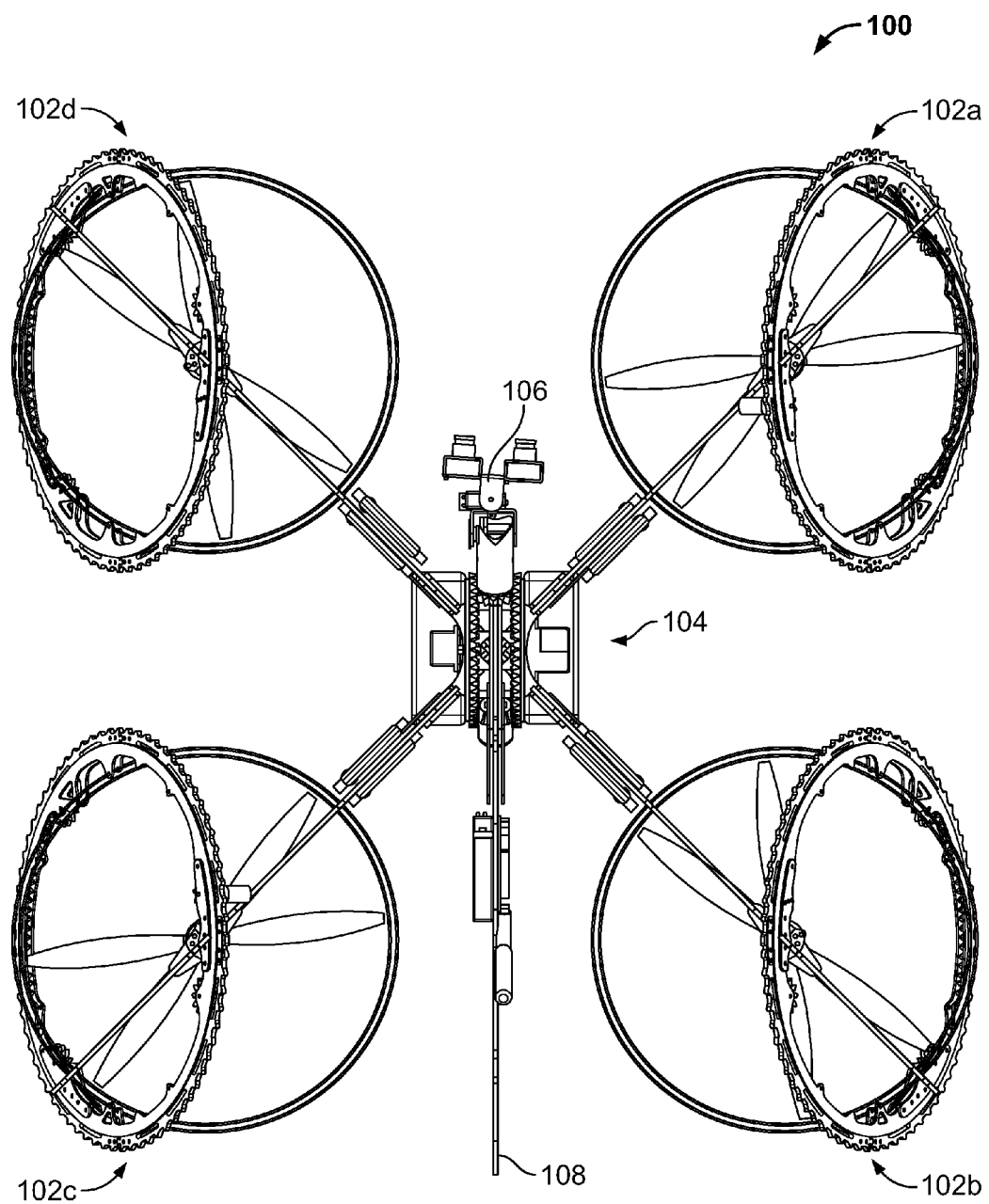
FIG. 8 is a top view of the vehicle of FIG. 1.

FIG. 8 is a top down view of the vehicle 100 of FIG. 1, showing the footprint of the vehicle 100 and the relationship of the wheels and rotor systems of the propulsion units 102*a*-102*d*. As can be seen, the footprint of the vehicle is roughly a square, with the propulsion units symmetrically arranged in four quarters, although in other embodiments the vehicle may be longer or wider, such that the vehicle has a rectangular footprint, for example. Likewise, the bulk of the components of the main work section 104 are symmetrically arranged so that the vehicle is substantially balanced. Further, asymmetrical components such as the head 106 and the boom 108 can be sized and weighted such that when the rotatable plates 112 of the vehicle 100 are arranged in a neutral or default position, the head 106 and the boom 108 are generally in balance. The balanced nature of the vehicle 100 can improve control of the vehicle 100.

Figure 9:
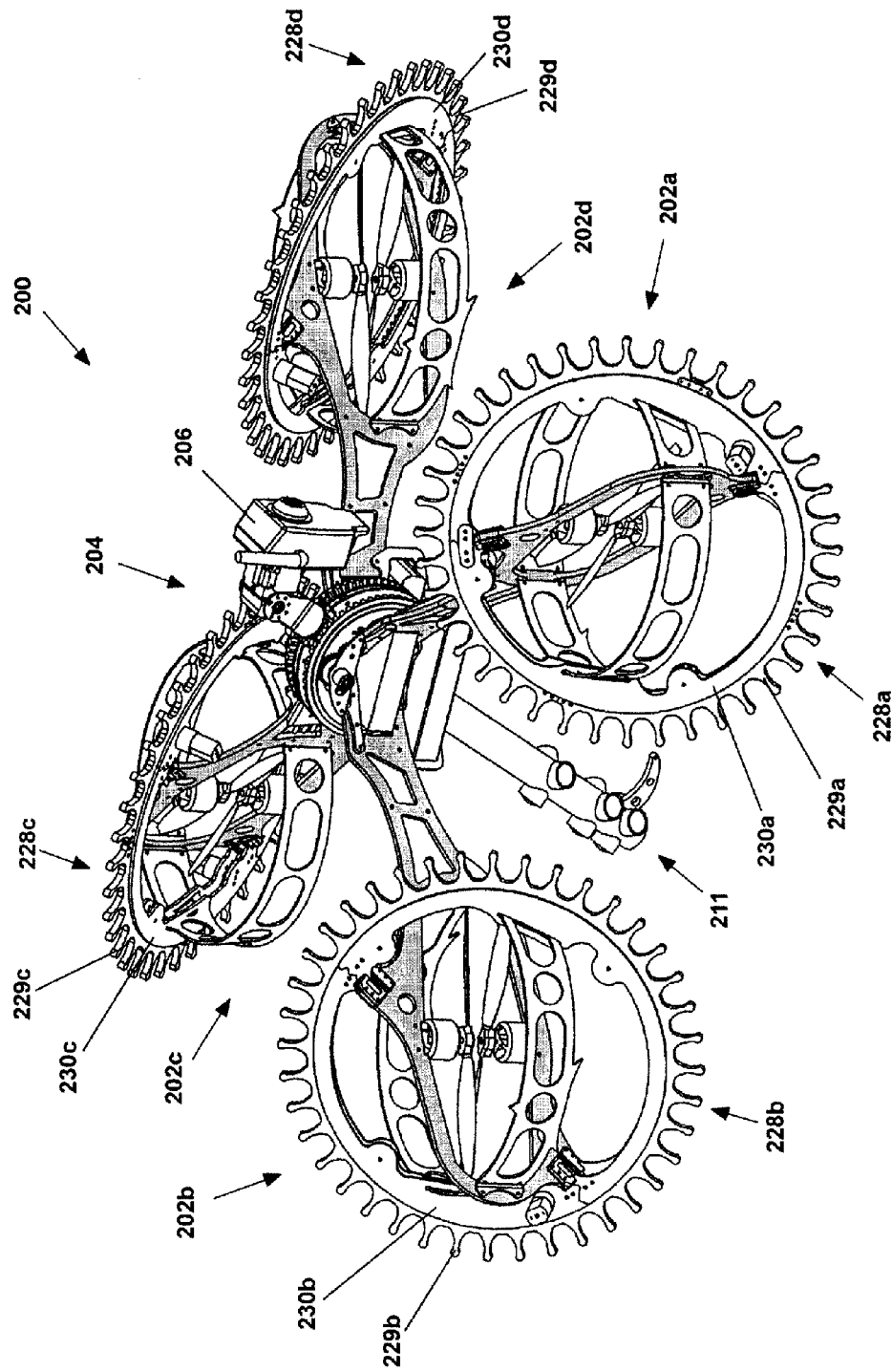
FIG. 9 is a front perspective view of an alternative embodiment of a vehicle in accordance with the present invention adapted to travel along surfaces and through fluids.
Figure 10:
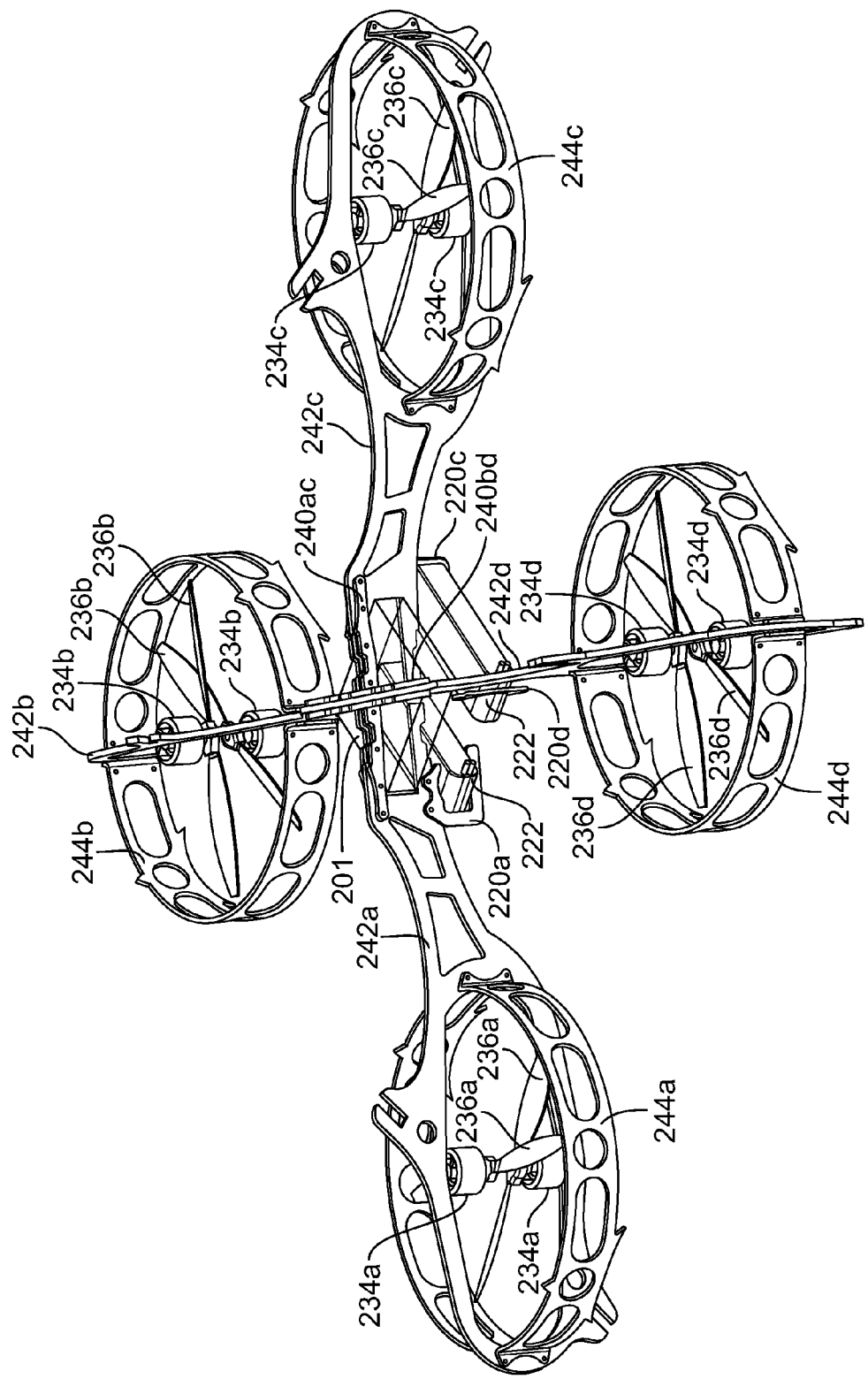
FIG. 10 is a front perspective of the vehicle of FIG. 9, partially stripped to illustrate a relationship of a core to control the vehicle relative to the propulsion units of the vehicle.

FIGS. 9 and 10 are front perspective views of an alternative embodiment of a vehicle 200 in accordance with the present invention adapted for moving along surfaces and moving through fluids. As above, the vehicle 200 includes four propulsion units 202a-202d arranged at corners of the vehicle 200 and connected with arm frames 242a-242d extending from a main work section 204. As can be seen, the treads of the wheels include deep grooves which may be useful, for example, in an environment such as a wooded area where twigs and brush are prevalent and slippage can occur. Also, the rotor guards 244a-244d connected with the arm frames 242a-242d comprise a single perforated piece rather than a series of rings. Further, the primary batteries 222 are held directly below a core and are held in position by brackets 220a-220d connected directly to the arm frames 242a-242d rather than to cross braces. One of ordinary skill in the art will appreciate, upon reflecting on the teachings herein and the differences between the embodiments, that numerous changes to the structure of the vehicle can be made without deviating from the spirit of the invention.

FIG. 10 is a front perspective view of the vehicle 200 of FIG. 9 with the main work section 204 and wheels removed to show more clearly how some of the components of the vehicle 200 are connected. In contrast to the embodiment of FIG. 1, the arm frames 242a-242d of the vehicle 200 are connected by a single pair of cross-braces 240ad, 240bd along the upper edges of the arm frames 242a-242d. The core 201 is shown as a square occupying a space between the cross-braces 240ad, 240bd and the lower edge of the arm frames 242a-242d. Further, the rotor guards 244a-244d each comprise two halves that are connected by together at opposite ends of a hoop defined by the corresponding arm frame 242a-242d.

Figure 11:
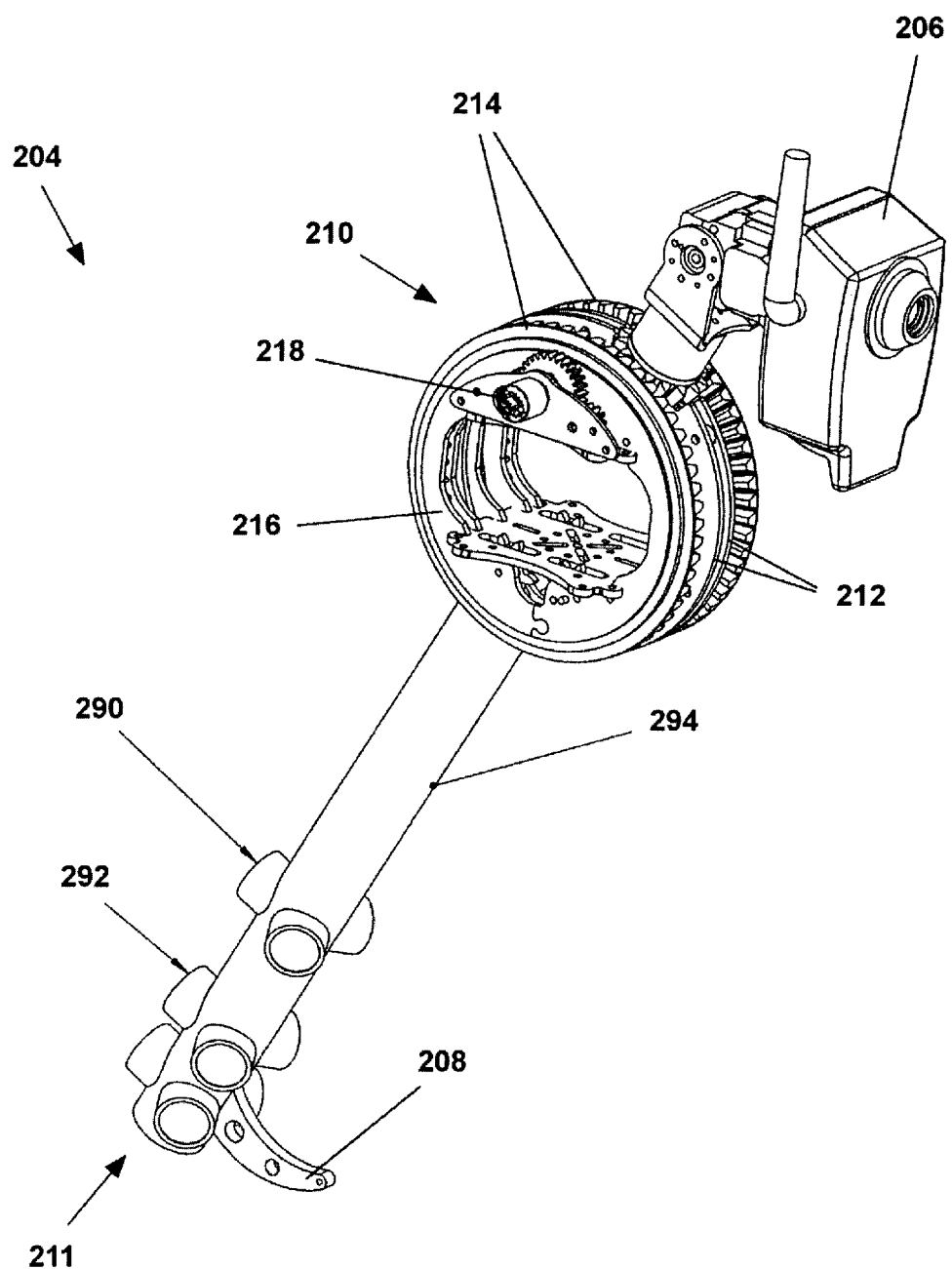
FIG. 11 is a front perspective view of a main work section of the vehicle of FIG. 9 in isolation.

The main work section 204 is shown in detail in FIG. 11, separated from the propulsion units 202a-202d to more clearly show its components. As with the embodiment of FIG. 1, the main work section 204 includes a multi-axis stability system 210 having a payload support hub and a payload support structure rotatable about the payload support hub. The payload supports structure comprises a pair of rotatable plates 212 sandwiched between two rotatable gears 214. The rotatable gears 214 are each sandwiched between a pair of hub plates 216 that act as the payload support hub. However, unlike the embodiment of FIG. 1, the motors 218 that independently drive the two rotatable gears 214 are arranged above the space in which the core 201 is received. As above, the stability system 210 can act as a quasi three-axis gimbal. When the rotatable gears 214 are rotated in the same direction, the rotatable plates 212 are rotated by the motion of a camera 206 which has a geared base with teeth that move with the rotatable gears 214 about a pitch axis of the vehicle 200. When the rotatable gears 214 are rotated in opposite directions, the rotatable plates 212 remain in place and any geared payloads arranged between the teeth of the rotatable gears 214 (such as a camera 206) can be rotated about a second axis that can extend anywhere from the roll axis to the yaw axis, depending on the position of the payload about the pitch axis.

The camera 206 extending from the rotatable plates 212 includes a head pivotably hinged at the end of a mast to allow the camera to pivot up and down with the pitch of the vehicle 200. As the rotatable plates are rotated and the angle of the camera 206 is changed relative to true horizon, the head of the camera can pivot to remain level with true horizon. The base of the mast is geared to allow the camera 206 to accommodate rolling motions of the vehicle 200. Unlike the embodiment of FIG. 1, the head of the camera 206 includes a single lens, and also includes a video uplink device with antenna, sensors, and a laser range finder. One of ordinary skill in the art will appreciate, upon reflecting on the previous described embodiment, the diversity of sensor payloads and effector payloads that can be employed in place of or in addition to the camera 206.

A boom 211 extends from the rotatable plates 112 at a position between approximately 180° away from the camera 206 along the surface of the rotatable plates 212, although in other embodiments the hook can be arranged elsewhere along the rotatable plates. Like the camera 206, the hook 208 is geared, and can be rotated about a second axis and will rotate about the pitch axis along with the camera 206 and other payloads mounted on the rotatable plates 212 when the rotatable plates 212 themselves are rotated. A retractable hook 208 extends from the boom 211 to catch the vehicle 200 on a protruding feature, such as the ledge of a building. Still further, in some embodiments, the hook 208 can allow the vehicle 200 to hang from a power line, for example by rotating the rotatable plates 212 so that the hook extends upwards vertically. In some embodiments, the hook 208 can be used to recharge batteries of the vehicle 200 using a magnetic field generated by current travelling through the power line while the vehicle 200 hangs from the power line. The boom 211 is a cylindrical tube, and can house a number of devices, as well as a secondary battery 294 within the boom 211 to power the devices and/or camera, and possibly other components of the vehicle 200. The devices can include, for example, sensors such as an optic flow sensor 290, and a 3D camera 292 arrangeable at high or low orientations based on the orientation of the boom 211.

Referring again to FIGS. 9 and 10, the propulsion units 202a-202d resemble the propulsion units 102a-102d of FIG. 1 and each comprises an arm frame 242a-242d connected with the main work section 204 by a cross-braces 240ad-240bc that extends through the space defined by the payload support hub as well as the payload support structure. As above, the arm frames 242a-242d can be fabricated from a single sheet of material to reduce weight and simplify fabrication. Power and control signals can be delivered to the propulsion units by wires running along the arm frames 242a-242d. Alternatively, the arm frames 242a-242d can include internal wiring or conductive paths printed on the surface of the arm frames 242a-242d.

Distal ends of the arm frames 242a-242d expand to resemble open hoops. Rotor systems connected within the hoops each comprise pairs of rotor blades 236a-236d rotated by corresponding pairs of rotor motors 234a-234d connected to the tops and bottoms of the arm frames 242a-242d, respectively, and extending toward each other. As mentioned above, the rotor systems are at least partially shielded from objects and surfaces that the vehicle comes into contact with by rotor guards 244a-244d comprising two halves of a perforated band.

The arm frames 242a-242d also support rotatable wheels that can propel the vehicle 200 along a surface. The wheels 228a-228d can operate independent from the rotor system or in conjunction with the rotor system. The wheels 228a-228d of the vehicle 200 can be automatically operated when sensors detect that the vehicle 200 has contacted a surface, or alternatively (or selectively) the wheels can be manually operated, for example by a person piloting the vehicle 200. Referring back to FIG. 9, the wheels 228a-228d each comprise a ring-shaped hub 230a-230d connected with a corresponding arm frame 242a-242d and at least partially arranged about the rotor system. The ring-shaped hubs 230a-230d each comprise a pair of plates which sandwich a ring-shaped rotatable portion 229a-229d of the wheel 228a-228d having an inner diameter that is toothed to mesh with gears within the ring-shaped hub 230a-230d and an outer diameter having a tread for gripping surfaces to propel the vehicle 200 along the surfaces. The ring-shaped hubs 230a-230d have an inner diameter larger than the outer diameter of the rotor systems so that rotor systems are nested within the wheels 228a-228d and the rotor blades 236a-236d can spin freely without interference from the wheels 228a-228d. As above, the wheels 228a-228d are set at an angle relative to perpendicular.

As mentioned above, the tread of the outer diameter of the ring-shaped rotatable portions 229a-229d includes a series of uniformly deep grooves. As above, the tread can also include a grip material coating the outer surface of the rotatable portions 229a-229d. For example, the tread can be rubberized. Still further, the outer surface of the rotatable portion can include some other feature, such as a miniature tube-in-tire feature that can dampen impacts when the vehicle contacts a surface, or the outer surface can flare out or mushroom to have a wider width than the rest of the wheel, thereby increasing surface area for gripping opposing surfaces. One of ordinary skill in the art, upon reflecting on the teachings herein, will appreciate the myriad different wheel surfaces which can be used propel a vehicle along a surface.

Figure 12:
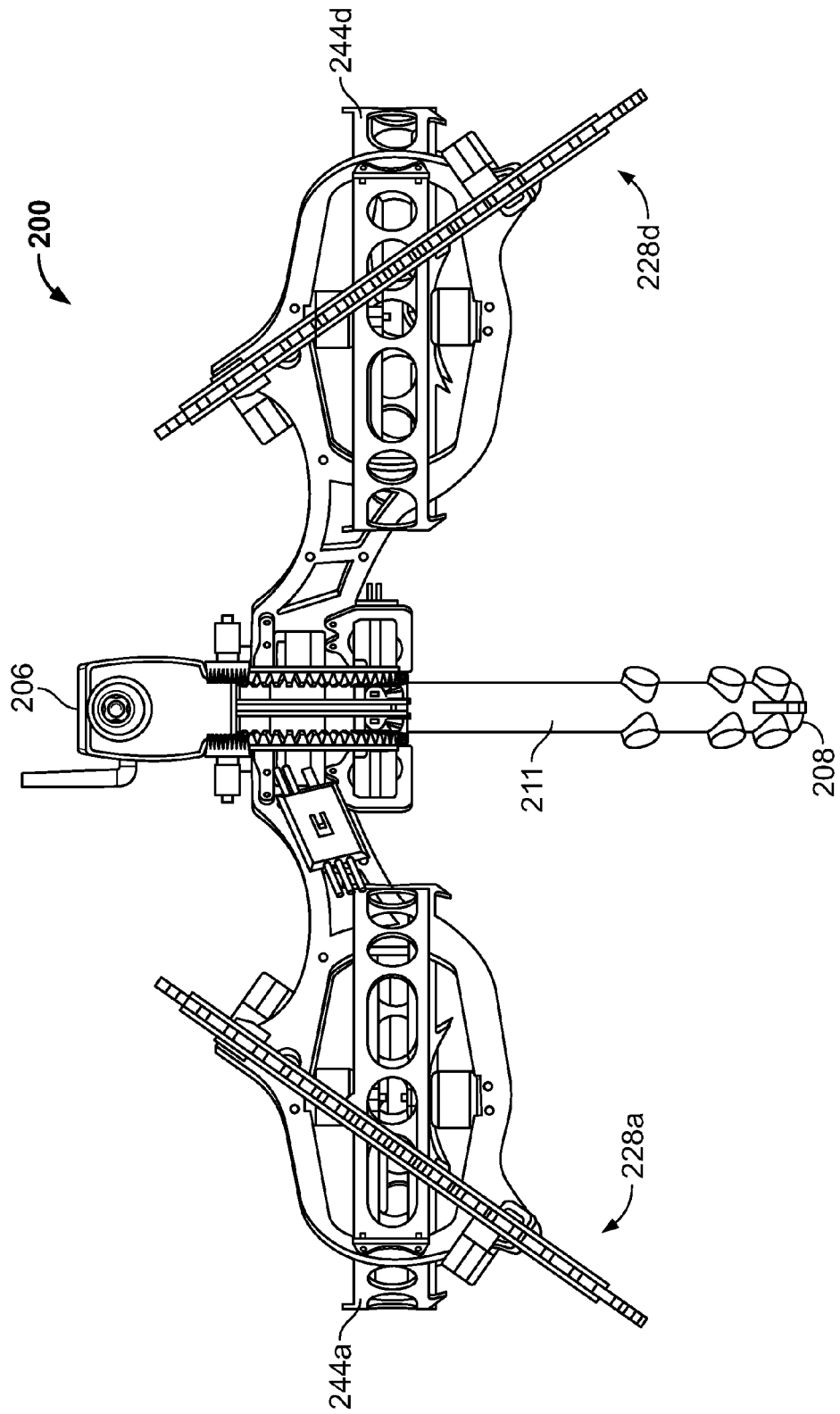
FIG. 12 is a front view of the vehicle of FIG. 9 with the main work section arranged in a first position.
Figure 13:
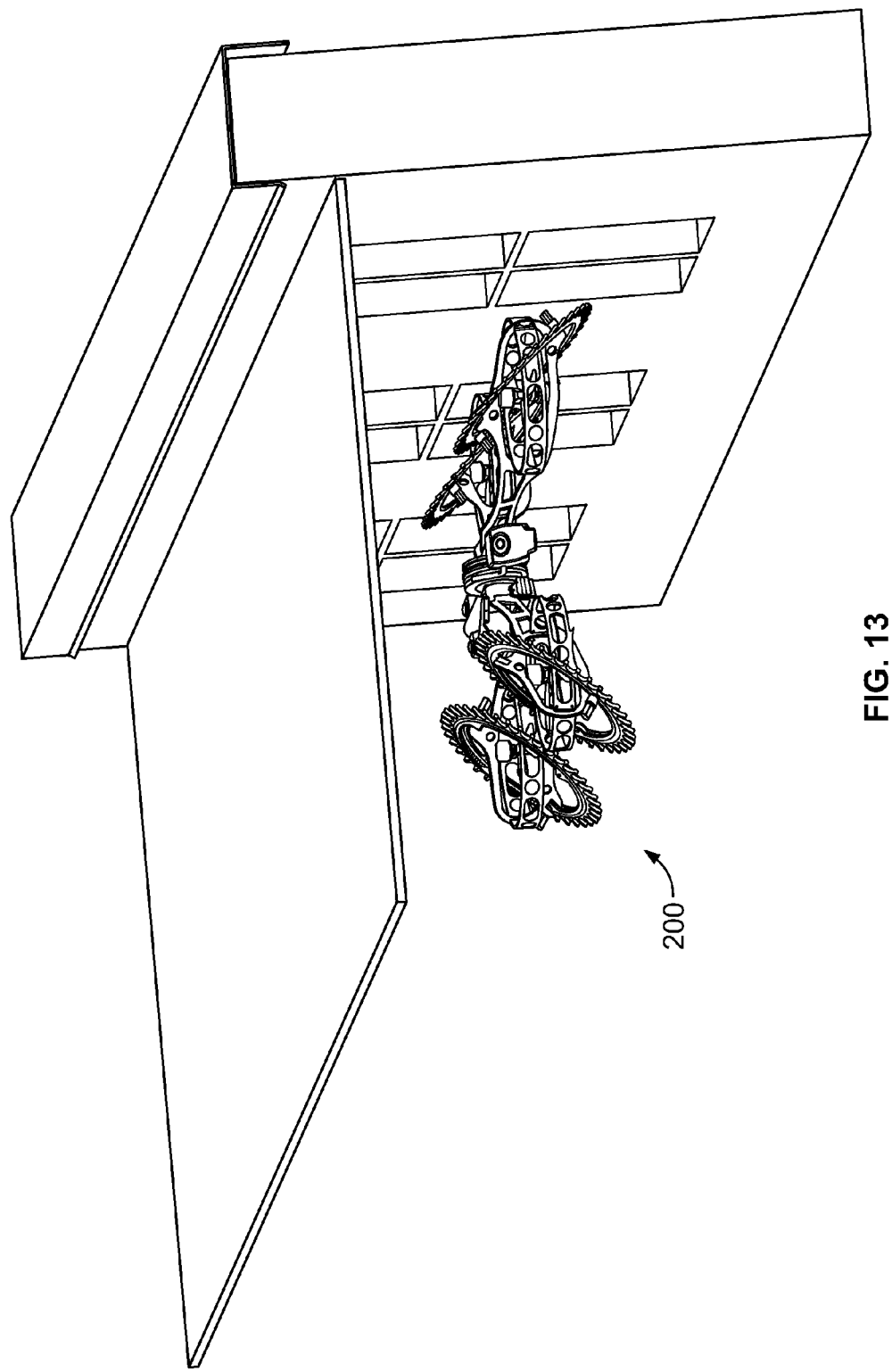
FIG. 13 is a front perspective view of the vehicle of FIG. 9 within an operating environment.
Figure 14:
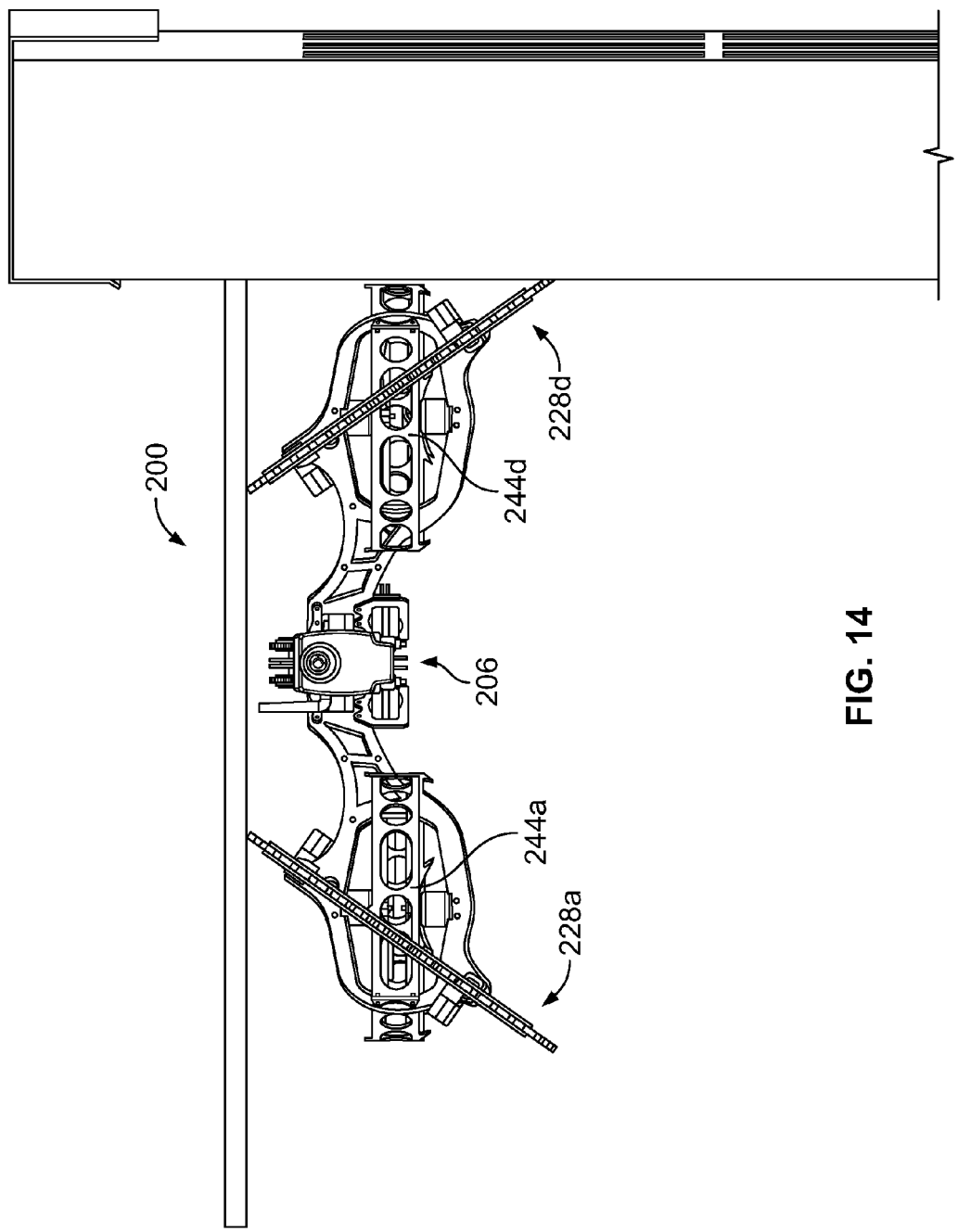
FIG. 14 is a front view of the vehicle of FIG. 9 with the main work section arranged in a second position for avoiding contact with a ceiling of an environment.

FIG. 12 is a front view of the vehicle 200 with the rotatable plates 212 of the main work section 204 being arranged at a possible neutral or default position. This position could be determined based on weight distribution, or preferred arrangement of the boom 211, or for some other reason. The boom 211 extends below the edge of the wheels 228a and 228d, and the camera 206 extends above the edge of the wheels 228a and 228d. FIGS. 13 and 14 shows the vehicle 200 in an enclosed space with the rotatable plates being rotated to a second position wherein the camera 206 and boom 211 are generally arranged in a horizontal plane while the vehicle 200 is in flight. Referring to FIG. 14, the vehicle 200 is shown moving against the wall and ceiling and being propelled by the wheels 228a-228d. In contrast to FIG. 12, the camera 206 does not extend above the edge of the wheels 228a-228d in the horizontal position and therefore does not obstruct or interfere with propulsion of the vehicle by the wheels 228a-228d. In some embodiments, movement of the rotatable plates can be automatic in response to proximity sensors detecting an approach of the vehicle to a surface, whether a ceiling or a floor, so that the camera 206 and boom 211 will not interfere with propelling the vehicle by the wheels 228a-228d.

Figure 15:
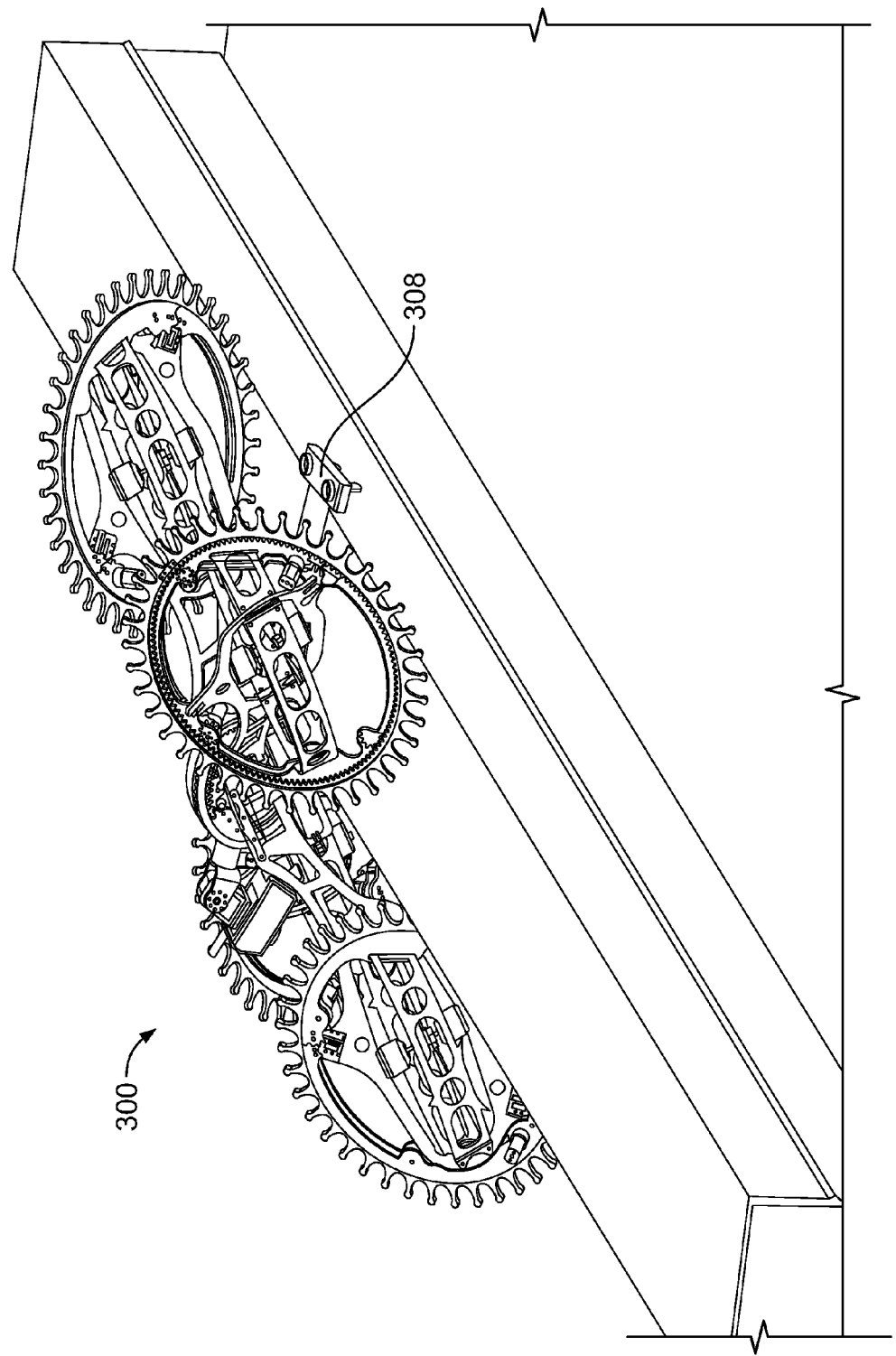
FIG. 15 is a rear perspective view of a further embodiment of a vehicle in accordance with the present invention perched on a ledge and held in position by a hook.

Referring to FIG. 15, a still further embodiment of a vehicle 300 in accordance with the present invention is shown perched on the ledge of a building. The vehicle 300 comprises a boom-and-hook 308 that is different from previously discussed embodiments. The hook 308 extends straight outward from a distal end of the boom, the opposite side of which includes a 3D stereo camera. As can be seen, with the vehicle 300 perched on the ledge of the building the camera can be pivoted downward to observe and/or record a scene below. The capability of the vehicle 300 to take advantage of multiple modes of locomotion and to reach and fix itself to various observation points makes the vehicle useful, for example, for surveillance and other tasks requiring remote viewing.

Figure 17:
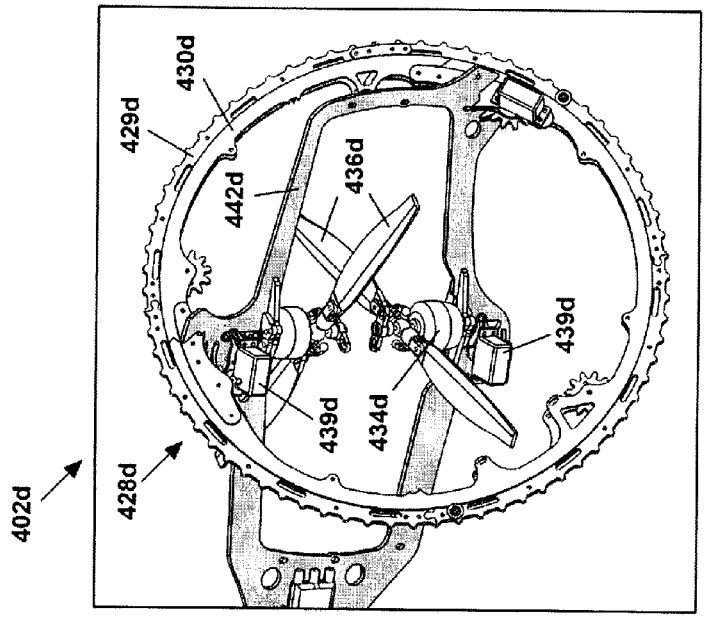
FIG. 17 is a rear perspective view of the propulsion unit of FIG. 16.
Figure 16:
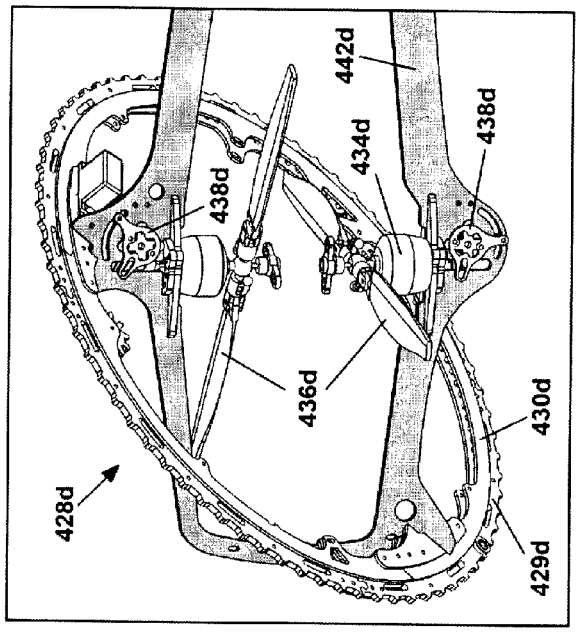
FIG. 16 is a front perspective view of a further embodiment of a propulsion unit for use with vehicles in accordance with the present invention.

Referring to FIGS. 16 and 17, a propulsion unit 402d of a still further embodiment of a vehicle in accordance with the present invention is shown. As with previously described embodiments, the propulsion unit 402 (which is representative of four propulsion units of the vehicle) comprises a wheel 428d arranged about a rotor system. The wheel 428d includes a ring-shaped rotatable portion 429d that is rotatable about a ring-shaped hub 430d. The wheel 428d is mounted to an arm frame 442d that forms a hoop within which is arranged the rotor system. The rotor system includes a pair of rotor blades 436d driven by respective rotor motors 434d. However, unlike previously described embodiments, the propulsion unit 402d further comprises a collective pitch control. Collective pitch control allows changes to a pitch angle of the rotor blades 436d collectively. The vehicle can increase or decrease the total lift derived from the rotor system through collective pitch control. In level flight this would cause a climb or descent, while with the vehicle pitched forward an increase in total lift would produce acceleration together with a given amount of ascent. In embodiments, collective pitch control can enable the vehicle to reverse the vehicle's level flight orientation so that the vehicle is effectively inverted or upside down. Collective pitch control is achieved in the rotor system of the embodiment of FIGS. 16 and 17 by additional pitch motors 439d that operate a cam 438d to drive a mechanical linkage that changes the pitch of the rotor blades 436d.

One of ordinary skill in the art will appreciate, upon reflecting on the teachings provided herein, that the components described with respect to specific embodiments can be used in any of the embodiments. Further, it should be appreciate that features and components described herein but not shown in the figures likewise can be used with any of the embodiments herein. Likewise components shown in the described embodiments need not be used, particularly with respect to payload choice. The figures are necessarily limiting due to the myriad different combinations of components possible.

The previous description of the preferred embodiments is provided to enable any person skilled in the art to make or use the embodiments of the present invention. While the invention has been particularly shown and described with reference to preferred embodiments thereof, it will be understood by those skilled in the art that various changes in form and details may be made therein without departing from the spirit and scope of the invention.

What is claimed is:

1. A vehicle propellable through fluids or along surfaces, comprising:
a main work section for supporting one or more payloads;
a plurality of propulsion units for propelling the main work section, each of the propulsion units including
a rotor system,
a ring-shaped wheel at least partially arranged about the rotor system and rotatable about the rotor system; and
wherein the ring-shaped wheel is arranged at a banked angle relative to the rotor system; and
wherein when the vehicle is level and moving horizontally along a plane, for each of the propulsion units the banked angle is such that the ring-shaped wheel extends outside of the rotor system so that the ring-shaped wheel contacts, before the rotor system contacts, any surface perpendicular to or parallel to the plane.

2. The vehicle of claim 1, further comprising a ring-shaped hub at least partially arranged about the rotor system;
wherein the ring-shaped wheel is rotatable about the ring-shaped hub; and
a wheel motor connected with the ring-shaped hub for rotating the ring-shaped wheel.

3. The vehicle of claim 1, wherein the plurality of propulsion units comprise four propulsion units approximately symmetrical arranged about the vehicle, and wherein each of the plurality of propulsion units is connected with the main work section by an arm frame.

4. The vehicle of claim 1, wherein the main work section includes
a payload support hub,
a payload support structure rotatable about the payload support hub, and
a core at least partially nested within the payload support hub, and
wherein the one or more payloads is mountable on the payload support structure.

5. A vehicle propellable through fluids or along surfaces, comprising:
a main work section for supporting one or more payloads;
a plurality of propulsion units for propelling the main work section, each of the propulsion units including
an arm frame extending from the main work section,
a rotor system connected with the arm frame, the rotor system including at least one rotor blade,
a ring-shaped hub connected with the arm frame and at least partially arranged about the at least one rotor blade, the ring-shaped hub having an inner diameter larger than the outer diameter of the at least one rotor blade, and
a ring-shaped wheel rotatable about the ring-shaped hub, wherein the ring-shaped wheel is arranged at a banked angle relative to the at least one rotor blade.

6. The vehicle of claim 5, wherein the main work section includes
a payload support hub,
a payload support structure rotatable about the payload support hub, and
a core at least partially nested within the payload support hub, and
wherein the one or more payloads is mountable on the payload support structure.

7. The vehicle of claim 6, wherein the payload support structure allows multi-axis rotation of a mounted payload.

8. The vehicle of claim 6, wherein the one or more payloads includes one or more sensor payloads and/or one or more effector payloads.

9. The vehicle of claim 8, wherein the one or more sensor payloads includes a camera mounted to the payload support structure independent of a boom;
wherein the camera including a laser range finder and a rotation sensor.

10. The vehicle of claim 6, further comprising:
a hook connected with the payload support structure;
wherein the hook is adapted to catch a structure and support the vehicle on the structure.

11. The vehicle of claim 10, further comprising a battery;
wherein the hook is adapted to charge the battery when the structure on which the vehicle is supported is a power line or other source of electrical current.

12. The vehicle of claim 6, wherein the payload support structure is rotatable 360° about the payload support hub in at least one axis;
wherein the core includes at least one microprocessor; and
wherein the at least one microprocessor is adapted to substantially maintain an orientation of the payload support structure relative to a horizon line as the vehicle is propelled.

13. The vehicle of claim 5, further comprising a wheel motor connected with the ring-shaped hub for rotating the ring-shaped wheel,
wherein when the vehicle is level and moving horizontally along a plane, for each of the propulsion units the banked angle is such that the ring-shaped wheel extends outside of the rotor system so that the ring-shaped wheel contacts, before the rotor system contacts, any surface perpendicular to or parallel to the plane.

14. The vehicle of claim 5, wherein the plurality of propulsion units comprise:
four propulsion units substantially symmetrically arranged; and
wherein the rotor system of each of the propulsion units includes at least two rotor blades;
wherein a pitch of the rotor blades is collectively controllable.

15. A vehicle propellable through fluids or along surfaces, comprising:
a main work section including a payload support hub, a payload support structure rotatable about the payload support hub, and a core at least partially nested within the payload support hub;
wherein one or more payloads is mountable on the payload support structure;
a plurality of propulsion units for propelling the main work section, each of the propulsion units including
a rotor system,
a ring-shaped wheel at least partially arranged about the rotor system and rotatable about the rotor system; and
wherein the ring-shaped wheel is arranged at a banked angle relative to the rotor system.

16. The vehicle of claim 15, wherein when the vehicle is level and moving horizontally along a plane, for each of the propulsion units the banked angle is such that the ring-shaped wheel extends outside of the rotor system so that the ring-shaped wheel contacts, before the rotor system contacts, any surface perpendicular to or parallel to the plane.

17. The vehicle of claim 15, further comprising a ring-shaped hub at least partially arranged about the rotor system;
wherein the ring-shaped wheel is rotatable about the ring-shaped hub; and
a wheel motor connected with the ring-shaped hub for rotating the ring-shaped wheel.

18. The vehicle of claim 15, wherein the payload support structure is rotatable 360° about the payload support hub in at least one axis;
wherein the core includes at least one microprocessor; and
wherein the at least one microprocessor is adapted to substantially maintain an orientation of the payload support structure relative to a horizon line as the vehicle is propelled.

19. The vehicle of claim 15, wherein the plurality of propulsion units comprise:
four propulsion units substantially symmetrically arranged; and
wherein the rotor system of each of the propulsion units includes at least two rotor blades; and
wherein a pitch of the rotor blades is collectively controllable.

20. The vehicle of claim 15, wherein the one or more payloads includes one or more sensor payloads and/or one or more effector payloads.

* * * * *